United States Patent [19]

Hoashi et al.

[11] Patent Number: 4,930,083
[45] Date of Patent: May 29, 1990

[54] ANTI-SKID BRAKE CONTROL SYSTEM

[75] Inventors: Akira Hoashi, Kawasaki; Hideo Akima, Yokohama; Haruki Shimanuki, Kasukabe; Yuji Matsubara, Kazo, all of Japan

[73] Assignee: Fujitsu Limited, Kawasaki, Japan

[21] Appl. No.: 262,256

[22] Filed: Oct. 20, 1988

Related U.S. Application Data

[63] Continuation of Ser. No. 28,543, Mar. 20, 1987, abandoned.

[30] Foreign Application Priority Data

Mar. 20, 1987 [JP] Japan .................................. 61-062434

[51] Int. Cl.$^5$ ............................................. B61C 15/08
[52] U.S. Cl. .................................. 364/426.02; 303/20; 180/197
[58] Field of Search ................. 364/426.01, 426.02, 364/426.03; 303/20, 94, 95; 180/197

[56] References Cited

U.S. PATENT DOCUMENTS

| | | | |
|---|---|---|---|
| 3,589,776 | 6/1971 | Wehde ........................... | 303/94 X |
| 3,718,374 | 2/1973 | Ochia ............................ | 318/426 X |
| 3,832,008 | 8/1974 | Leiber et al. .................. | 364/426.02 |
| 4,321,676 | 3/1982 | Ohmori et al. ................ | 318/426 |
| 4,398,260 | 8/1983 | Takahashi et al. ............ | 364/426 X |
| 4,485,445 | 11/1984 | Braschel ....................... | 364/426.02 |
| 4,504,911 | 3/1985 | Braschel et al. .............. | 364/426.02 |
| 4,517,647 | 5/1985 | Harada et al. ................. | 364/426 |
| 4,543,633 | 9/1985 | Cook ............................. | 364/426.02 |
| 4,562,542 | 12/1985 | Skarvada ....................... | 364/426.02 |

FOREIGN PATENT DOCUMENTS 57-147950  9/1982  Japan ................................... 364/426

OTHER PUBLICATIONS

Heinz Leiber, et al., "Electronic Control Unit for Passenger Car Antiskid", Proceeding of the 29th IEEE Vehicular Technology Conference, Arlington Heights, Il. U.S.A.

Primary Examiner—Bentsu Ro
Attorney, Agent, or Firm—Staas & Halsey

[57] ABSTRACT

An anti-skid brake control system for a motor vehicle comprising: a wheel speed sensor which is disposed for each wheel of a vehicle and generates a pulse signal having a pulse cycle which corresponds to a revolution speed of each wheel; a pulse cycle measuring circuit for detecting the cycle of the pulses of the pulse signal from the wheel speed sensor; and, condition setting means for setting anti-skid brake control condition factors in accordance with the wheel speed. The anti-skid brake system is controlled in accordance with the condition factors set by the condition setting means.

6 Claims, 12 Drawing Sheets

ANTI-SKID BRAKE CONTROL SYSTEM

This is a continuation of co-pending application Ser. No. 028,543 filed on 3/20/87, now abandoned.

BACKGROUND OF THE INVENTION

1. Field of the Invention

This invention relates to an anti-skid control system for achieving a satisfactory rotational behavior of the wheels of a motor vehicle during a braking operation. More particularly, this invention pertains to an anti-skid control system which is designed to increase and reduce brake fluid pressure in a desirable manner to prevent the wheels from becoming locked.

Especially, the present invention relates to means for avoiding malfunctions of the anti-skid braking system by changing the factors for controlling the braking system in accordance with the velocity of the vehicle.

2. Description of the Related Art

There have been heretofore proposed a variety of anti-skid control systems wherein, during a braking operation, the brake fluid pressure is reduced to prevent the occurrence of an undesirable wheel lock, and the brake fluid pressure thus reduced is then increased to avoid an undesirable extension of the brake stopping distance. Among such conventional anti-skid control systems in one wherein different pressure buildup rates are stored; a desired one of the stored pressure buildup rates is selected; and brake fluid pressure is increased with the selected buildup rate, for example. To effect the pressure buildup rate selection, a system has been proposed, wherein a solenoid-operated valve adapted to be opened and closed with a relatively high frequency is provided in the brake fluid pressure buildup system; a pulse train generator such as multivibrator is provided in the drive system for the solenoid-operated valve; and the timing with which the solenoid-operated valve is driven by a pulse train signal derived from the multivibrator is controlled on the basis of a signal representing wheel acceleration (British Patent Specification No. 1305430).

Conventionally, the applicants have been developing a wheel speed sensor which generates a pulse signal having pulses the cycle of which corresponds to the revolutional speed of the wheel. The cycle of the pulse signal is measured by counting the number of clock pulses included within the cycle, as described in detail later. In this measuring method, as illustrated in FIG. 4, an error of one clock pulse occurs in accordance with the relative position between the wheel speed pulse signal and the clock pulse signal. The cycle of the wheel speed pulse signal becomes short when the wheel velocity becomes fast. FIG. 5 shows relationship between the wheel velocity V and the cycle T of the wheel speed pulse signal generated from the wheel speed sensor. In accordance with the increase of the velocity V, the cycle T becomes short, thus the difference of one clock pulse affects the detected velocity more significantly in the high speed region than in the low speed region ($V_L > V_S$). Especially, when the vehicle speed exceeds 110 km/h, the adverse influence of the error becomes so great that the anti-skid brake system malfunctions if the system is controlled in accordance with the same controlling factors as in the low speed region.

SUMMARY OF THE INVENTION

An object of the present invention is to provide an anti-skid brake control system in which the above-mentioned problems are alleviated by detecting the wheel velocity and changing the conditions for starting the anti-skid brake operation in accordance with the wheel velocity.

In accordance with the present invention, there is provided an anti-skid brake control system for a motor vehicle comprising: a wheel speed sensor which is disposed for each wheel of a vehicle and generates a pulse signal having a pulse cycle which corresponds to a revolutional speed of each wheel; a pulse cycle measuring circuit for detecting the cycle of the pulses of the pulse signal from the wheel speed sensor; and, condition setting means for setting anti-skid brake control condition factors in accordance with the wheel speed, wherein the anti-skid brake system is controlled in accordance with the condition factors set by the condition setting means.

DESCRIPTION OF THE PREFERRED EMBODIMENTS

Figure 1:
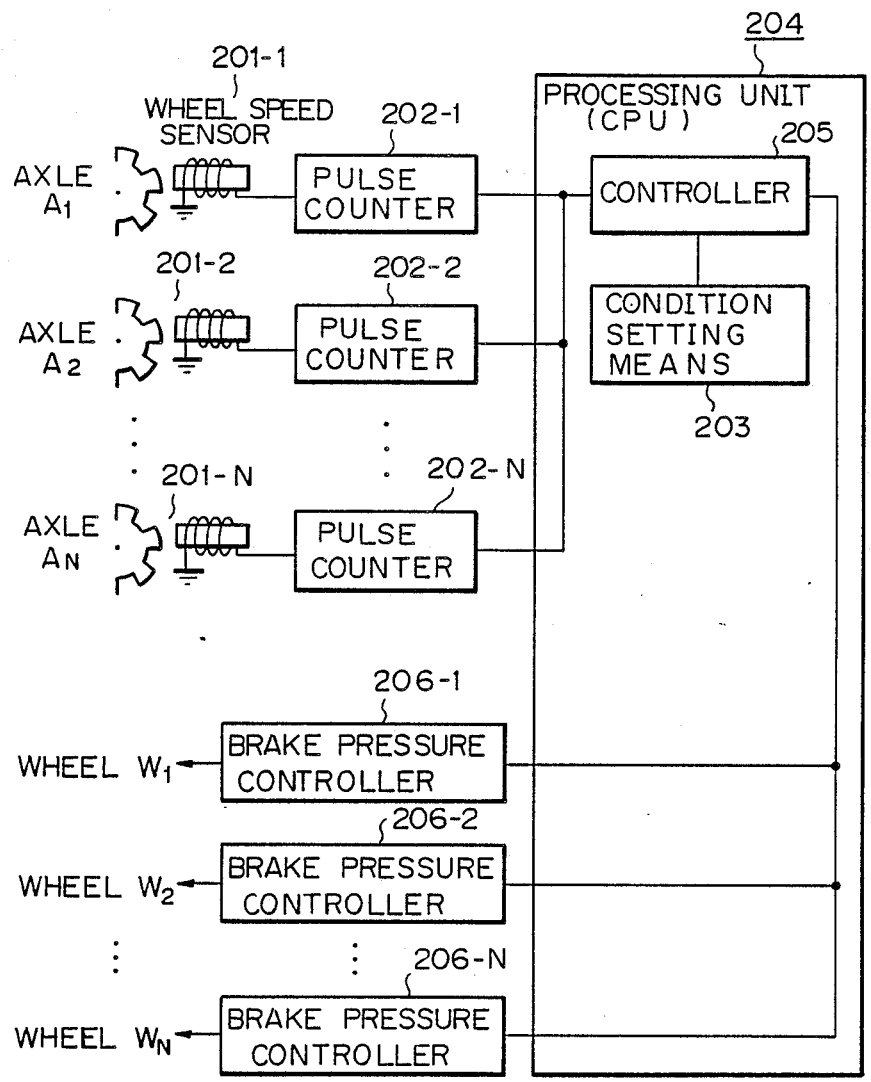
FIG. 1 is a constructional view of an anti-skid brake control system according to the present invention.

FIG. 1 illustrates an embodiment of the present invention which obviates afore-mentioned drawbacks of the prior art. Wheel speed sensors 201-1 to 201-N detect the revolutional speed of axles $A_1$ to $A_N$, respectively, which speed is represented as a cycle length of pulses. Note, usually N is 2 or 4. Pulse counters 202-1 to 202-N measure the wheel speed from the cycle of the pulse signal from the wheel speed sensors 201-1 to 201-N, respectively, as described in detail later.

Condition setting means 203 selects and sets the optimal conditions for starting the anti-skid brake operation in accordance with the wheel speed. The conditions are, such as, the time T during which the deceleration state calculated from the wheel speed data continues and the cross point between the reference wheel speed and the detected wheel speed, etc. The controller 205 performs the anti-skid brake control in accordance with the set conditions.

Figure 6:
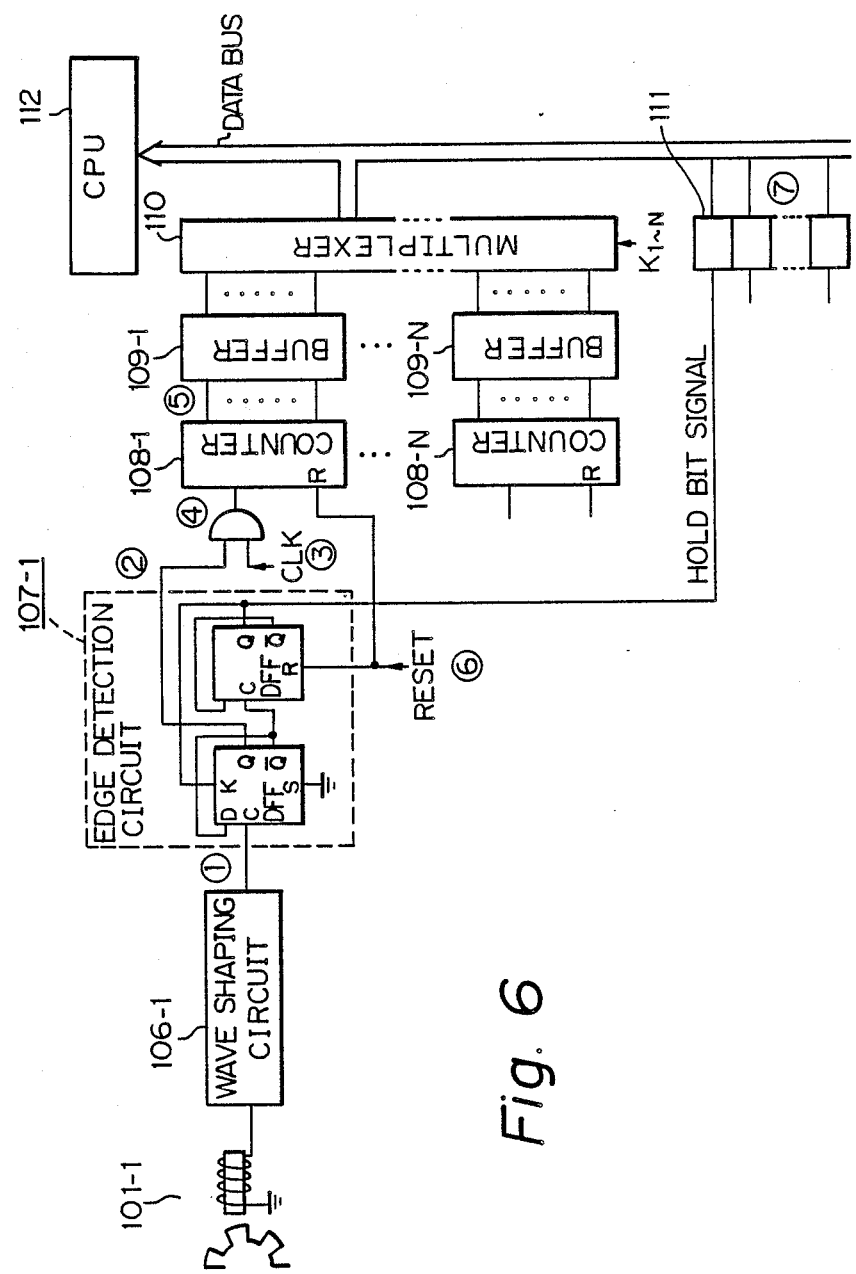
FIG. 6 is a block diagram of a circuit for detecting the wheel speed.
Figure 7:
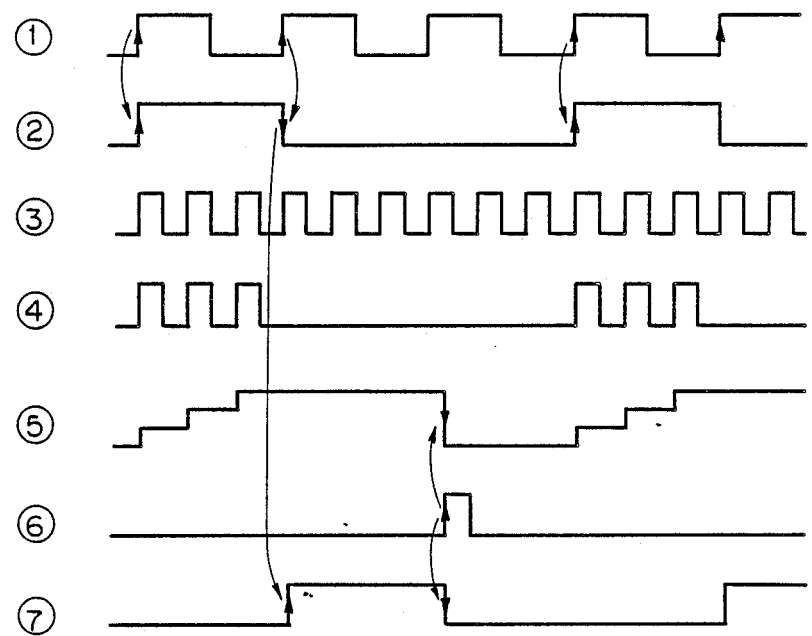
FIG. 7 is an explanatory view for explaining the function of the circuit of FIG. 6.

An example of the wheel speed measuring means in the anti-skid brake system is described hereinafter with reference to FIGS. 6 and 7. FIG. 6 is a block circuit diagram of the wheel speed measuring means. The circuit comprises a wave shaping circuit 106-1, an edge detection circuit 107-1, counters 108-1 to 108-N, buffers 109-1 to 109-N, multiplexer 110, a hold bit circuit 111, and a central processing unit (CPU) 112. The wave shaping circuit 106-1 trims the wave signal of the wheel speed detected by the wheel speed sensor 101-1 into a rectangular pulse signal. The edge detection circuit 107-1 generates a signal corresponding to a cycle of the wheel speed pulses which have been shaped to rectangular pulses by the wave shaping circuit, by using the rising point or falling point of the shaped rectangular pulse as a trigger point. Each of the counters 108-1 to 108-N counts clock pulses during one cycle of the rectangular pulse signal output from the edge detection circuit 107-1. The buffers 109-1 to 109-N register the data of the count results output from the counters 108-1 to 108-N. The multiplexer 110 selects the data registered in the buffers 109-1 to 109-N and outputs this data to the data bus. The hold bit holding circuit 111 holds the state of completion of the wheel speed pulse cycle measurement process conducted by the counters 108-1 to 108-N. The CPU 112 scans the hold bit holding circuit 111 and reads out the registered data stored in one of the buffers 109-1 to 109-N corresponding to the hold bit position in the hold bit holding circuit 111, through the multiplexer 110. The CPU 112 then transmits a reset signal ⑥ to reset the edge detection circuit 107-1 and the counters 108-1 to 108-N. The hold bit holding circuit 111 is also reset by resetting the edge detection circuit 107-1. The CPU 112 then transmits a control signal to the anti-skid brake drive means (not shown) to control the anti-skid brake system in response to the read out wheel velocity data.

The function of the circuit of FIG. 6 is further described with reference to FIG. 7. Wave signal ① represents the trimmed pulse signal output from the wheel velocity sensor 101-1 and shaped by the wave shaping circuit 106-1. Wave signal ② represents an output signal from the edge detection circuit 107-1 and comprises pulses having a width corresponding to the length of one cycle of the pulses of the wave signal ①. Wave signal ③ represents clock pulses. The time of one cycle of the pulses of signal ① is measured by counting the clock pulses of the wave signal ③. Wave signal ④ represents an input signal transmitted to the counter 108-1. Wave signal ⑤ is the output signal from the counter 108-1 and represents the count result of the number of pulses of the signal ④. Wave signal ⑥ is a pulse signal for resetting the edge detection circuit 107-1 and the counter 108-1. Wave signal ⑦ is a registered signal held in the hold bit holding circuit 111. Upon the detection of the setting of a hold bit in the hold bit holding circuit 111, the CPU 112 starts to read out the vehicle speed data registered in one of the buffers 109-1 to 109-N. The CPU 112 then transmits the reset signal ⑥ to reset the edge detection circuit 107-1 and the counter 108-1 so that the measurement of the vehicle speed is started again.

As mentioned above, a hold bit is set in the hold bit holding circuit 111 when the measurement of the wheel speed by the counters 108-1 to 108-N is ended. Therefore, the CPU 112 can read the wheel speed data from one of the buffers 109-1 to 109-N corresponding to the hold bit position in the hold bit holding circuit 111, by scanning the hold bit holding circuit 111 at any timing to control the anti-skid brake system.

Figure 8:
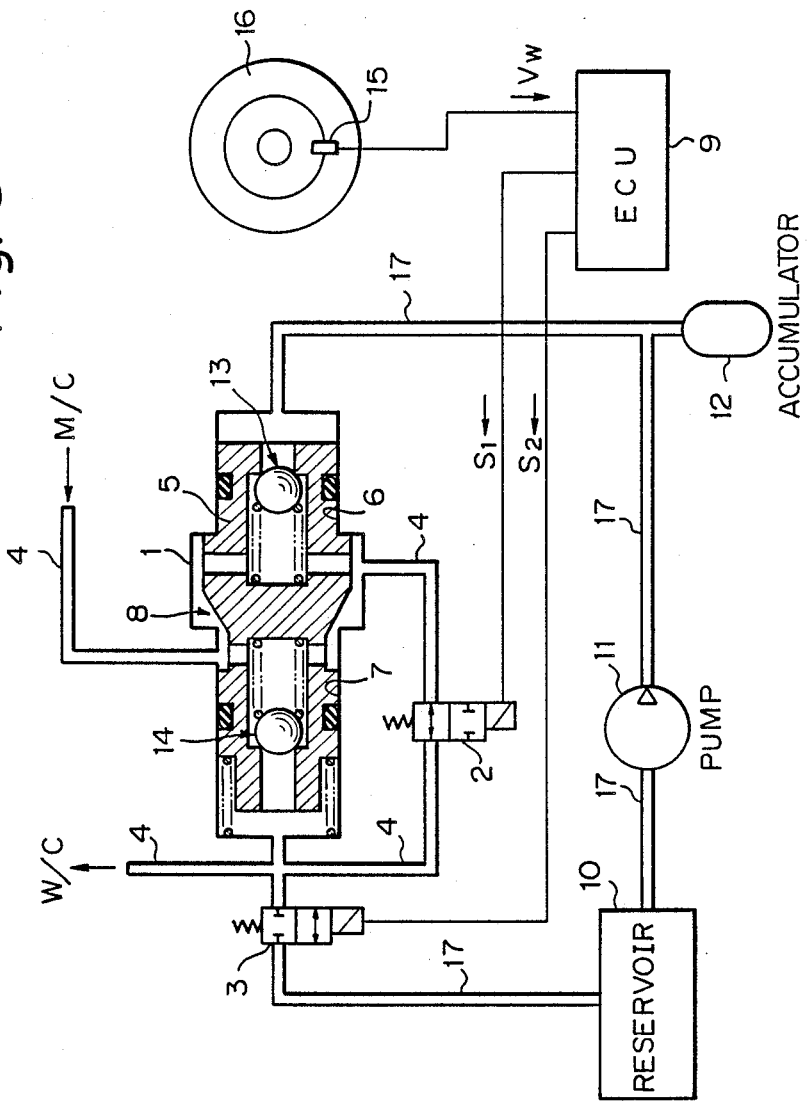
FIG. 8 is a constructional view of an anti-skid brake system to which the present invention is applied.

FIG. 8 illustrates an anti-skid control apparatus to which the present invention is applicable, which includes a gate valve 1, a pressure buildup-holding solenoid-operated valve (referred to simply as a pressure valve hereinafter) 2, a pressure-reducing solenoid-operated valve (referred to simply as reducing valve hereinafter) 3, a main fluid passage 4 extending from a master cylinder M/C (not shown) to wheel cylinders W/C of wheel brake devices (not shown) through the gate valve 1 and the pressure valve 2, and so forth.

The gate valve 1 includes cylinders 6 and 7 containing a differential pressure-responsive piston 5 which is arranged to close a valve portion 8 of the gate when the piston 5 is displaced to the left in the drawing due to a pressure difference. Upon closure of the valve portion 8, the main passage 4 extending between the master cylinder M/C and the wheel cylinder W/C is interrupted.

The pressure valve 2, which is normally open, is closed in response to a brake fluid pressure holding signal $S_1$ derived from a control circuit (electronic control unit) 9, and thereupon, the main passage 4 is interrupted so that a brake fluid pressure holding condition is established.

The reducing valve 3, which is normally closed, is opened in response to a pressure-reducing signal $S_2$ also derived from the control circuit 9, and thereupon, pressure fluid in the wheel cylinder W/C is pumped into an accumulator 12 by means of a pump 11 through a reservoir 10 and the thus pumped pressure fluid is returned between the gate valve 1 and the pressure valve 2 through a by-pass passage 17. Indicated at 13 and 14 are a check valve and relief valve, respectively.

A wheel velocity detector or speed sensor 15 is associated with a wheel 16 and arranged to provide detected information to the control circuit 9.

A motor vehicle is usually provided with a pair of anti-skid control systems, each being as shown in FIG. 8; one for controlling two wheels, such as front left and rear right wheels, and the other for controlling the remaining two wheels, such as front right and rear left wheels.

The control circuit 9 comprises a microcomputer with functions as described hereinafter with reference to FIGS. 9 and 10.

Figure 10:
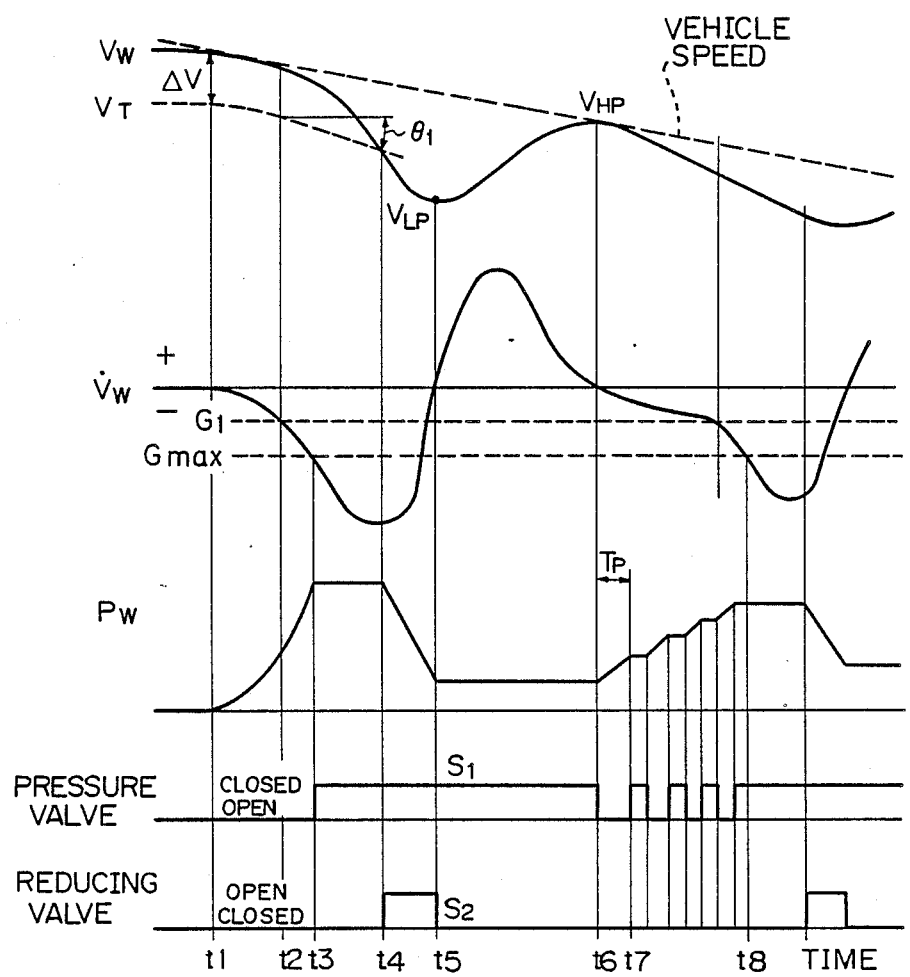
FIG. 10 is a graphical view for explaining the function of the anti-skid brake system to which the present invention is applied.

FIG. 10 shows the wheel speed $V_W$, wheel acceleration or deceleration $\dot{V}_W$ (differential of the wheel speed $V_W$), brake fluid pressure $P_W$ within the wheel cylinder W/C of the brake system, and the opening and closing timing of the pressure valve 2 and the reducing valve 3.

Typically, during time period from $t_1$ to $t_n$ shown in FIG. 10, the below-described control operations are performed by the control circuit of FIG. 9 in accordance with variations in the wheel speed $V_W$ detected by the speed sensor 15 shown in FIGS. 8 and 9. The wheel deceleration $\dot{V}_W$ is determined in a wheel deceleration determining unit 51 (FIG. 9) on the basis of the wheel speed $V_W$. The wheel deceleration $\dot{V}_W$ thus determined is then compared with a preset threshold level $G_1$ in a first comparator 52, and with another preset threshold level $G_{max}$ in a second comparator 53.

Time $t_1$: When a braking operation is started, the brake fluid pressure $P_W$ builds up so that the wheel deceleration $\dot{V}_W$ increases gradually.

A reference velocity $V_T$ is determined, based on the wheel speed $V_W$, in a reference velocity determination unit 54 (FIG. 9) which is controlled based on the output of the first comparator 52 in such a manner that $V_T$ is $\Delta V$ lower than $V_W$ and that the reduction rate of the reference velocity $V_T$ does not exceed a predetermined value $\theta_1$ which corresponds to the threshold level $G_1$.

Time $t_2$: When the wheel deceleration $\dot{V}_W$ reaches the threshold level $G_1$, an output signal "2" is derived from the first comparator 52, and the reference velocity $V_T$ decreases with the constant gradient $\theta_1$.

Time $t_3$: As the wheel deceleration $\dot{V}_W$ further increases, it reaches the threshold level $G_{max}$, and thereupon, the second comparator 53 provides an output signal "1" which in turn is passed through a first timer 55 to set a third flip-flop 79, which provides a signal through a first OR gate 56 to close the first valve 2. Therefore, the brake fluid pressure $P_W$ does not increase and maintains a constant value, as can be seen from the graph of $P_W$ in FIG. 10.

The threshold level $G_{max}$ is preset to prevent a further buildup of the brake fluid pressure $P_W$ when the wheel deceleration $\dot{V}_W$ increases beyond this threshold level.

At the beginning of the time $t_3$, the master cylinder M/C is isolated from the wheel cylinder W/C so that the brake fluid pressure $P_W$ prevailing within the wheel cylinder W/C is held constant. If $G_{max}$ is not detected even when a preset time has elapsed after the time when the signal "1" appeared, the timer 55 operates to block the signal "1".

Time $t_4$: When the wheel speed $V_W$ and reference velocity $V_T$ become equal to each other, the first flip-flop 58 is set and provides an output signal "3" which in turn is passed through a second timer 59 and a first AND gate 62 to cause the reducing valve 3 to be opened so that the brake fluid pressure $P_W$ within the wheel cylinder W/C is reduced, as represented by the line $P_W$ in FIG. 10.

If the output signal "3" still exists when a present time has elapsed after the time when this signal appeared, the second timer 59 operates to block the signal "3", thus causing the reducing valve 3 to be closed. In this way, the pressure reduction is prevented from continuing for longer than necessary.

A second flip-flop 61 is set by the signal "3". The output signal of the second flip-flop 61 is provided to the reducing valve 3 through the first AND circuit 62. The flip-flop 61 is arranged to be reset, when a preset time has elapsed from the time when the pressure valve 2 was closed, by the output of a delay timer 63 which enables a start of the operation thereof by the output signal "3"; with this arrangement, the anti-skid control system can be returned to the initial condition. This is based on the fail-safe concept, and the time preset in the delay timer 63 is selected to be sufficiently larger than one control cycle (the period from the time when a pressure reduction occurs to the next time when a pressure reduction occurs again).

Time $t_5$: When the wheel spaced $V_W$ reaches a low peak $V_{LP}$, then a low peak detector 60 provides an output signal "4", which in turn is passed to reset the first flip-flop 58. Consequently, the output signal "3" disappears, and thus the reducing valve 3 is closed. Therefore, the reduction of the brake fluid pressure $P_W$ stops and the pressure $P_W$ becomes constant.

As a consequence of the above-described operations, the brake fluid pressure $P_W$ within the wheel cylinder W/C is held constant (from $t_3$), reduced (from $t_4$), and again held constant (from $t_5$), and the pressure holding operation performed after the time $t_5$ is continued until a high peak of the wheel speed $V_W$ is detected at time $t_6$. Thus, the braking forces are reduced so that the wheel speed $V_W$ is sufficiently recovered.

Time $t_6$: When the wheel speed $V_W$ reaches a high peak $V_{HP}$, a high peak detector 66 provides an output signal "5", which in turn is passed to a store 65 so that a pressure buildup time ($T_P$) corresponding to the average acceleration computed in a logic unit 64 is read out. The polarity of the output signal of the store 65 is reversed in an inverter 67 so as to be converted to an output signal "6", which in turn appears at the output of the first OR circuit 56 through a second AND circuit 68. Thus the pressure buildup/holding signal $S_1$ disappears after the time ($T_P$). In this way, during the time ($T_P$), the pressure valve 2 is opened so that the brake fluid pressure $P_W$ builds up.

Time $t_7$: The pressure valve 2 is closed to maintain a constant brake fluid pressure for the time determined in response to the state of the deceleration during the time period $T_P$. Then the pressure valve 2 is repeated by opened and closed, to gradually increase the brake fluid pressure $P_W$ as represented in FIG. 10. When the deceleration value reaches $G_{max}$ (Time $t_8$), the pressure valve 2 is closed again to hold the brake fluid pressure constant. The above mentioned processes from the time $t_3$ are then repeated.

Figure 11:
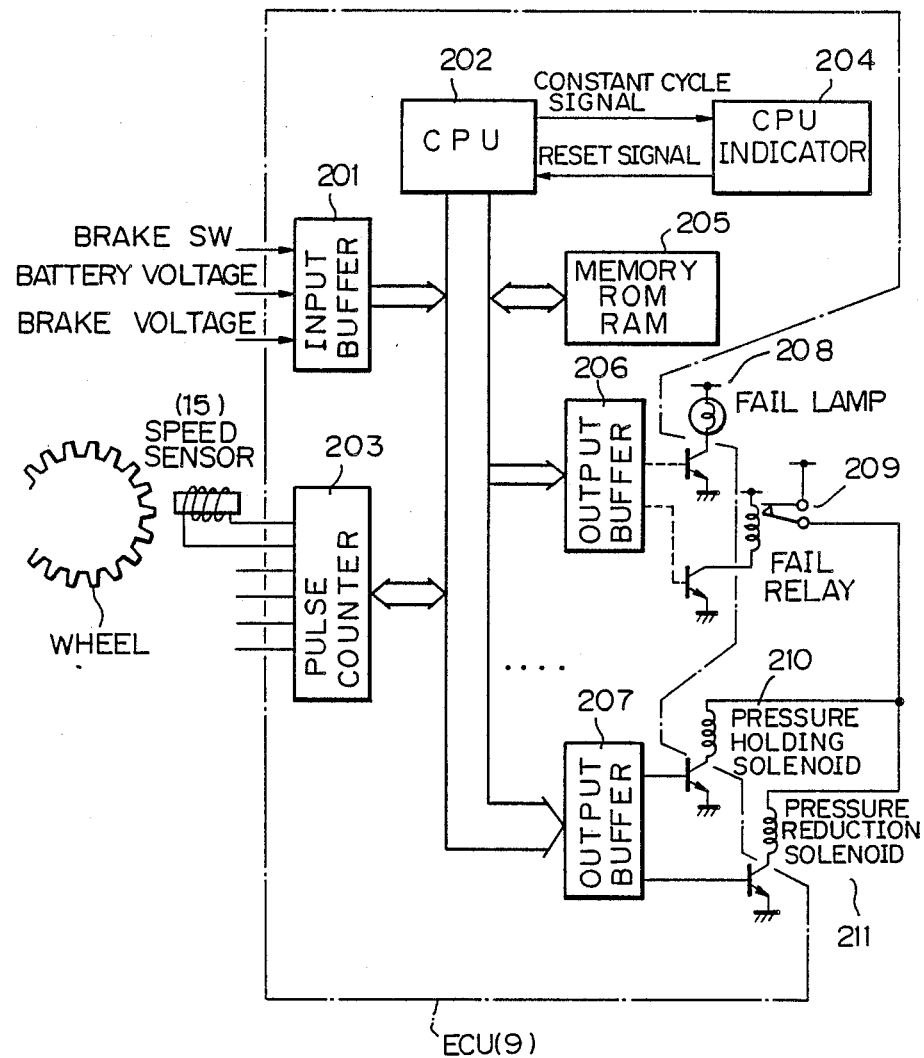
FIG. 11 is a block diagram for explaining the construction of the anti-skid brake system to which the present invention is applied.

FIG. 11 is a block diagram of the anti-skid brake control system of the present invention. A brake switch signal, battery voltage signal, and brake voltage signal are input to a CPU 202 through an input buffer 201, and wheel speed sensors 15 are connected to a pulse counter 203 which is connected to the CPU 202. The CPU 202 calculates wheel speed, acceleration, and deceleration in accordance with the calculation sequence registered in a memory 205 by the command of an indicator circuit 204, using the input data from the pulse counter 203. If an abnormal signal is input through the buffer 201, the indicator 204 turns on a fail lamp 208 through an output buffer 206 and drives a fail relay 209 to stop the operation of the anti-skid brake system and operate only the ordinary brake system. The CPU 202 drives a pressure holding solenoid 210 and a pressure reduction solenoid 211 through an output buffer 207 in accordance with the calculation results. The pressure holding solenoid 210 is interconnected to the afore-mentioned pressure valve, and the pressure reduction solenoid 211 is interconnected to the afore-mentioned reducing valve. The afore-mentioned anti-skid brake control is conducted by driving the solenoids 210 and 211 to open or close the pressure valve and the reducing valve.

Figure 12:
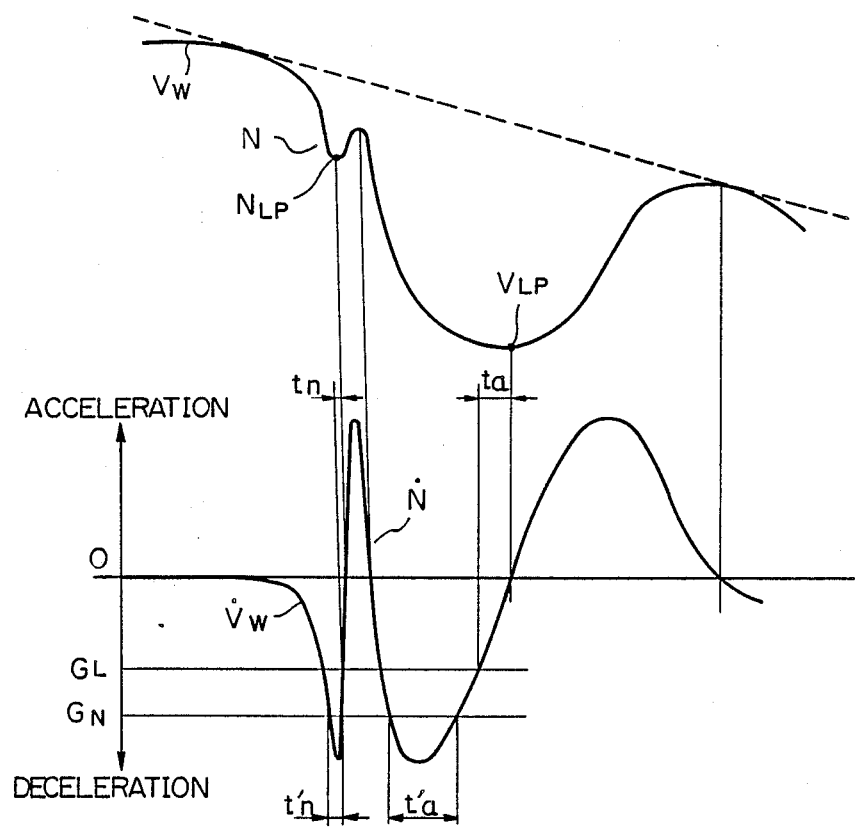
FIG. 12 is a graphical view for explaining the function of the present invention.

An object of the present invention is to avoid malfunctions of the anti-skid brake control system due to noise which appears in the detected wheel velocity data. This function of avoiding a malfunction is described further with reference to FIG. 12. A noise N appears on the wheel velocity curve $V_W$. Therefore, the differential curve $\dot{V}_W$ thereof has a noise wave N. In this differential curve $\dot{V}_W$, the time of a period wherein the deceleration of the wheel is more than a predetermined value $G_N$ is measured. This time, due to the noise, is represented as $t'_n$, whereas the time due to an actual deceleration by the braking operation is represented as $t'_a$. The time $t'_n$ of the noise is relatively short, whereas the time $t'_a$ of an actual deceleration is long. When this time is longer than a predetermined time ($T'_N$ of FIG. 13), the CPU determines that the calculated deceleration is due to an actual deceleration by the braking operation. On the other hand, if this time is shorter than the predetermined time, the CPU determines that the calculated deceleration is derived from the noise N.

The wheel velocity curve $V_W$ has a low peak $N_{LP}$ of the noise N. This low peak $N_{LP}$ is discriminated from the actual low peak $V_{LP}$ due to the braking operation, as follows. The CPU measures the time of a period wherein the deceleration is less than a predetermined valve $G_L$. Namely, the CPU measures the time from the point $G_L$ to the point of the low peak (the deceleration value is zero). This time $t_n$ of the noise low peak $N_{LP}$ is short, whereas the time $t_a$ of the actual low peak $V_{LP}$ is long. If the time before the low peak reaches a predetermined valve ($T_N$ of FIG. 14), the CPU determines that the calculated low peak is derived from an actual deceleration due to the braking operation. Whereas, if the time before the low peak is less than the predetermined value, the CPU determines that the calculated low peak is derived from the noise N.

Figure 13:
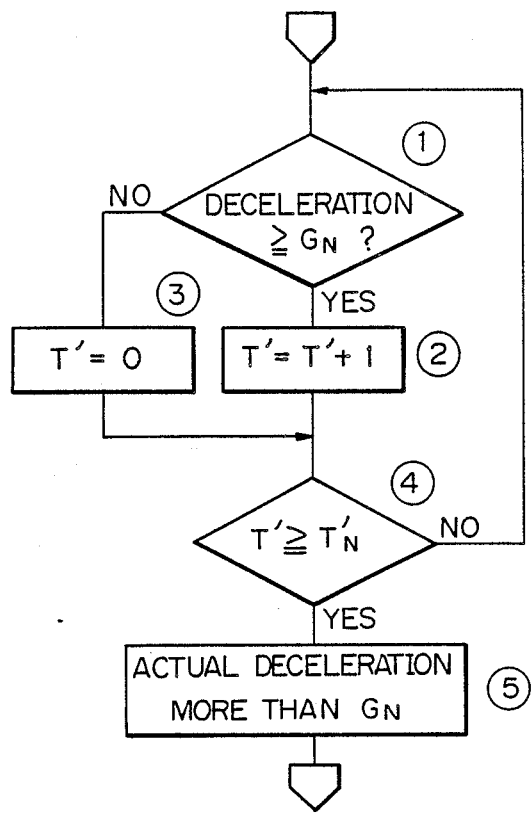
FIG. 13 is a flow chart of the process of discriminating an actual deceleration state according to the present invention; and, FIG. 14 is a flow chart of a process of discriminating the low peak of the wheel speed according to the present invention.
Figure 14:
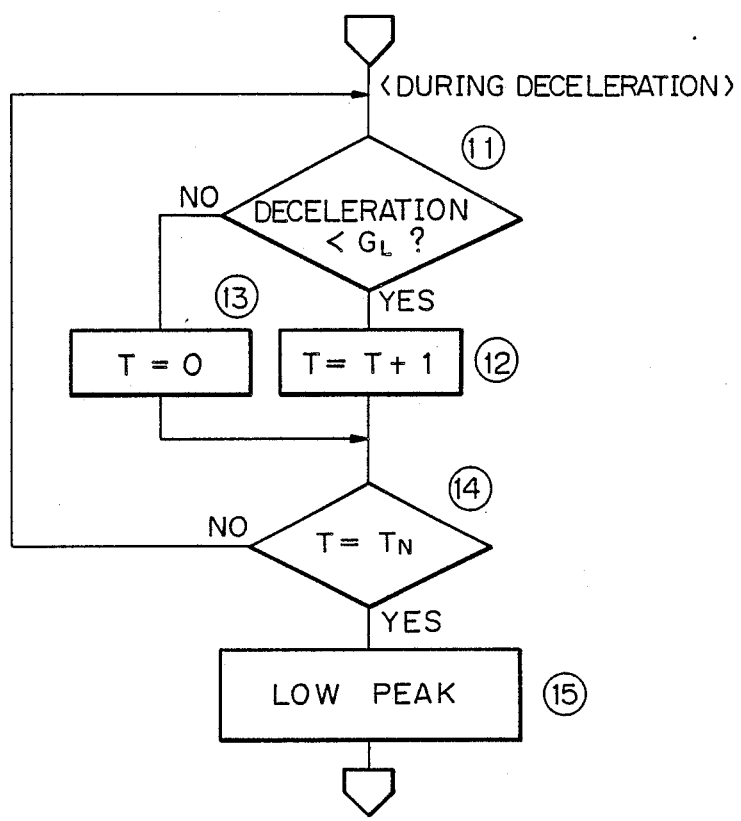
Figure 2:
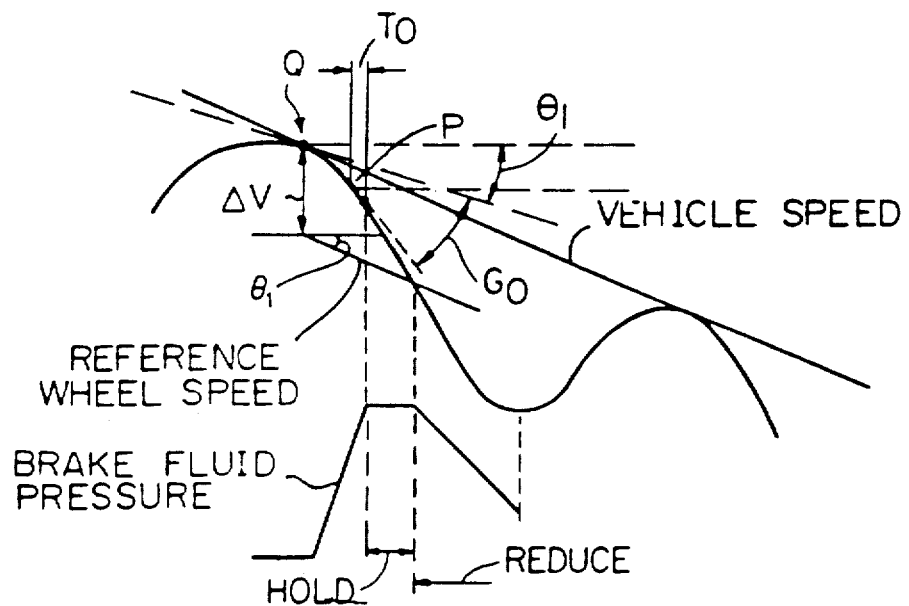

Such a deceleration judgement process is represented in the flow charts of FIGS. 13 and 14. In step ①of FIG. 13, the calculated deceleration is compared with the predetermined value $G_N$. If the wheel deceleration (negative acceleration) is larger than $G_N$, the count number T' (number of clock pulses) registered in a register in the CPU is incremented in step ②, and then step ④ is conducted. On the other hand, if the calculated deceleration is below $G_N$, the count number T' is cleared to zero in step ③, and then step ④ is conducted.

In step ④, the time corresponding to a count number T' registered in the register is compared with a predetermined valve $T'_N$. Namely, the time of the period wherein deceleration is equal to or more than $G_N$ is compared with the predetermined time $T'_N$. $T'_N$ is determined to be larger than the time due to noise so that the calculated deceleration state derived from the noise is discriminated. If T' is larger than the predetermined value $T'_N$, the CPU determines that the calculated deceleration state is derived from an actual deceleration due to the braking operation in step ⑤. If the T' is less than $T'_N$, the steps from step ① are repeated.

As mentioned above, if the deceleration state of more than $G_N$ continues for more than the time $T'_N$, the deceleration state is regarded as an actual deceleration state and discriminated from the deceleration state due to the noise N. The controller 205 of FIG. 1 performs an optimal anti-skid control operation in accordance with the discriminated actual deceleration data.

A similar discrimination process is conducted to discriminate an actual acceleration state from an acceleration state due to noise.

A process for discriminating the actual peak of the velocity curve is described in detail with reference to FIG. 14. In step ⑪ of FIG. 14, the calculated deceleration is compared with a predetermined value $G_L$. If the deceleration value is less than $G_L$, the count number T (number of clock pulses) registered in the register in the CPU is incremented in step ⑫, and then step ⑭ is conducted. On the other hand, if the deceleration value is more than $G_L$, the count number T is cleared to zero, and then step ⑭ is conducted.

In step ⑭, the time corresponding to the count number T is compared with a predetermined value $T_N$. If the number T is equal to $T_N$, the calculated deceleration state is determined to be the actual low peak ($V_{LP}$ of FIG. 12) in step 15. On the other hand, if the number T is below $T_N$, the steps from step 11 are repeated.

As mentioned above, the calculated deceleration low peak data is regarded as the actual low peak and discriminated as the actual low peak and discriminated from the low peak due to noise, when the deceleration state below $G_N$ continues for the predetermined time $T_N$, and the controller 205 of FIG. 1 performs an optimal anti-skid control in accordance with the calculated data of the actual low peak.

A similar discrimination process is conducted to discriminate an actual acceleration high peak from a high peak due to noise.

Figure 9:
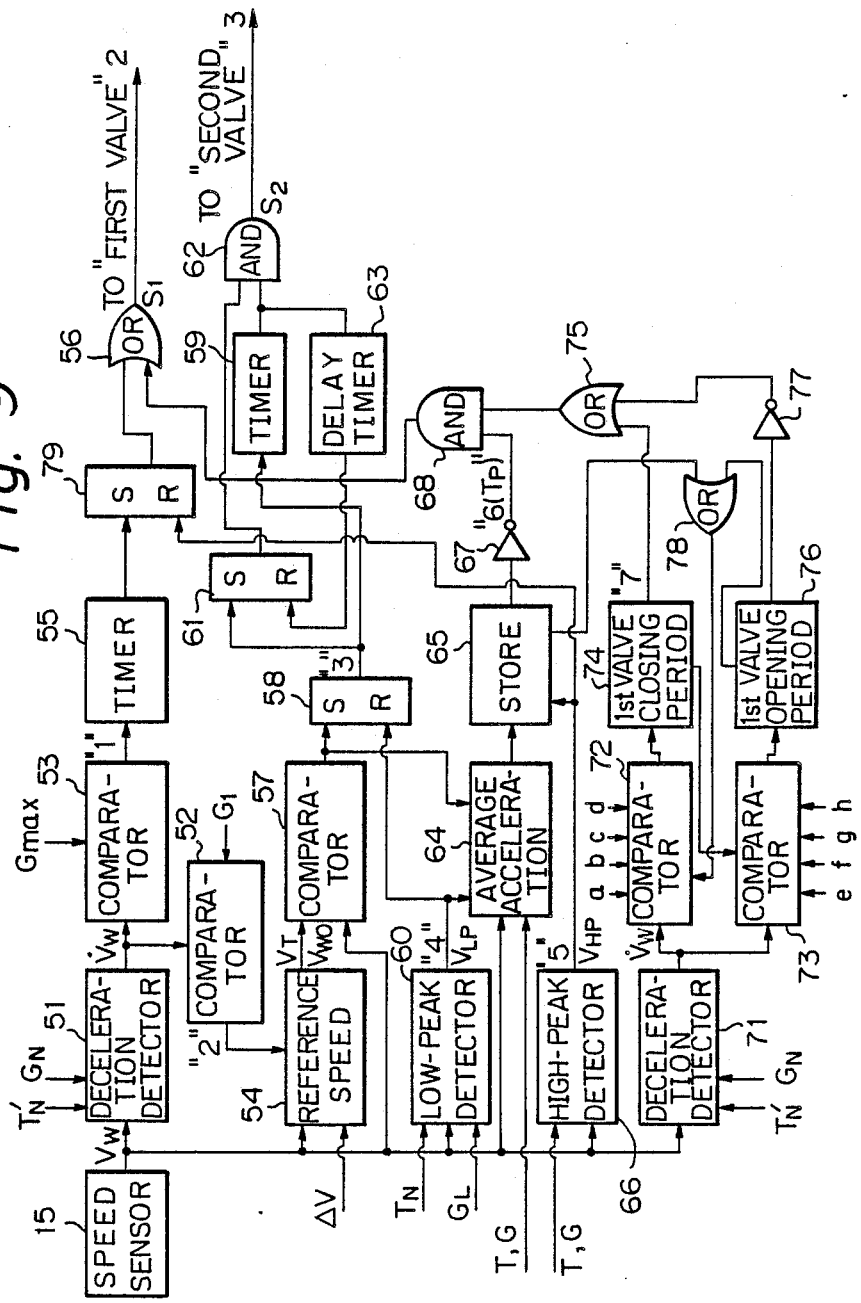
FIG. 9 is a block diagram of a circuit for controlling the anti-skid brake system according to the present invention.

The above mentioned predetermined values $G_N$ and $T'_N$ are input from the CPU to the deceleration detectors 51, 71 of FIG. 9 to discriminate the actual deceleration state. Also, the predetermined values $G_L$ and $T_N$ are input from the CPU to the low peak detector 60 of FIG. 9 to discriminate the actual low peak. Also, predetermined values T, G (corresponding to $T_N$, $T'_N$, $G_N$ and $G_L$) for discriminating the actual acceleration state and actual high peak are input from the CPU to the average acceleration detector 64 and the high peak detector 66.

The prescribed value of afore-mentioned $\Delta V$ is input from the CPU to the reference speed generator 54 (FIG. 9). Also, the prescribed values of $G_1$ and $G_{max}$ are input to the comparators 52 and 53, respectively.

These condition factors ($G_1$, $G_L$, $G_N$, $G_{max}$, $T_N$, $T'_N$, $\Delta V$) are determined to be optimal for the vehicle speed by the CPU. Namely, first, the CPU measures the vehicle speed and determines and sets the value of each of the above condition factors in accordance with the vehicle velocity. Then, the CPU operates the anti-skid brake system in accordance with the determined condition factors.

An example of condition factor setting process is described hereinafter with reference to FIGS. 1 to 3. As mentioned before, the revolutional speed of each of axles $A_1$ to $A_N$ is detected by each of wheel speed sensors 201-1 to 201-N as a pulse signal which cycle corresponds to the wheel speed and is measured by each of pulse counters 202-1 to 202-N to detect the wheel speed. The measured wheel speed data is transmitted to the condition setting means 203 through the controller 205.

The function of the condition setting means 203 is described below with reference to FIGS. 2 and 3.

When the starting conditions set by the condition setting means 203 is satisfied, the anti-skid brake controllers 206-1 to 206-N (FIG. 1) apply a brake fluid pressure to each wheel in accordance with the control conditions optimal to the detected vehicle speed state.

There are two conditions to be satisfied to start the anti-skid brake operation. The first is that the deceleration state calculated from the wheel speed data continues more than a predetermined time. The second is that the reference wheel velocity curve intersects the detected wheel velocity curve.

The first condition is that the time of deceleration state more than predetermined value $G_0$ from the point P exceeds a predetermined time $T_0$. This time $T_0$ corresponds to the afore-mentioned $T_N$ or $T'_N$ described with reference to FIG. 13 or 14. Also, the deceleration value $G_0$ corresponds to the afore-mentioned $G_N$ or $G_L$ in FIG. 13 or 14, $G_1$ or $G_{max}$ in FIG. 10. For example, if the deceleration exceeds $G_{max}$, the anti-skid brake controllers 206-1 to 206-N maintains the brake fluid pressure constant (see FIG. 10). The point P is a point on the wheel speed curve $V_w$ at which the deceleration thereof exceeds the above-mentioned predetermined value $G_o$. The "holding" state of the brake fluid pressure is started at this point P.

The second condition is that the reference wheel speed curve $V_T$ having inclination angle $\theta_1$ intersects the wheel speed curve $V_W$ (see FIG. 10). The reference wheel speed $V_T$ is defined as a straight line having the above-mentioned inclination angle $\theta_1$, and extending from a point which is slower (less) by a predetermined value $\Delta V$ than a point Q on the wheel speed curve $V_w$ at which the deceleration thereof corresponds to the inclination angle $\theta_1$. From the point at which the reference wheel speed $V_T$ intersects the wheel speed curve $V_w$, the anti-skid brake controllers 206-1 to 206-N starts to reduce the brake fluid pressure (see FIG. 10).

By varying $T_0$, $\Delta V$, $G_0$, $\theta_1$, an optimal anti-skid brake operation can be conducted in response to the wheel speed.

Figure 3:
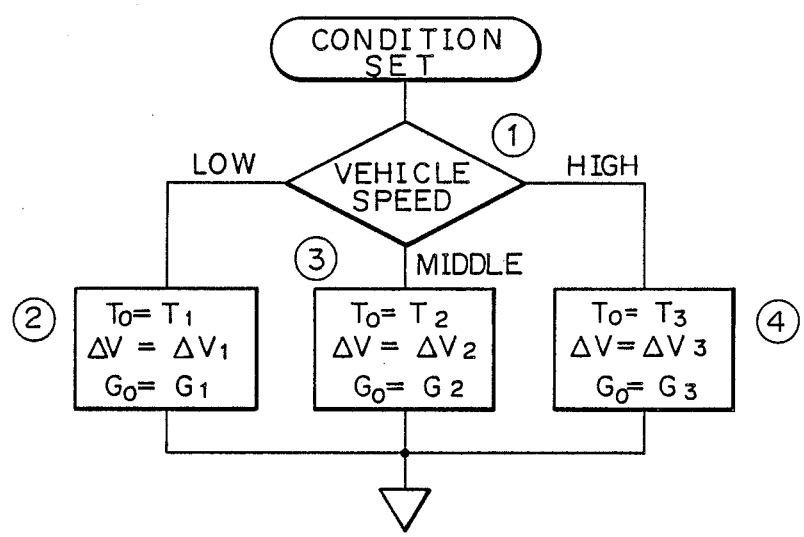
FIG. 3 is a flow chart of the anti-skid brake control system of the present invention.
Figure 4:
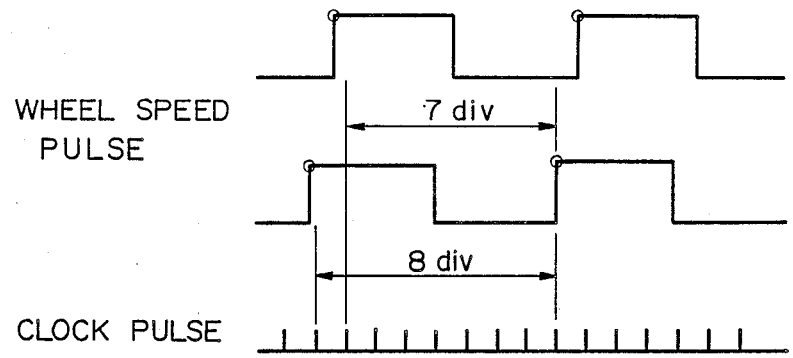
FIG. 4 is an explanatory view of the function of the wheel speed sensor.
Figure 5:
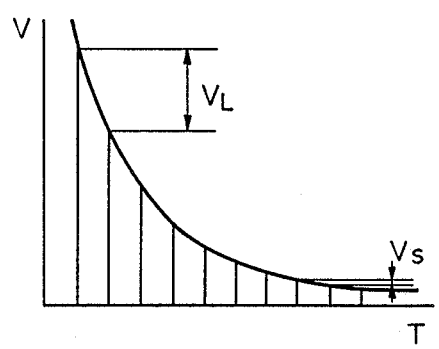
FIG. 5 is a graphical view representing relationship between the wheel speed V and the pulse cycle T of the wheel speed pulse signal.

FIG. 3 illustrates an example of condition setting process according to the present invention in which $V_2 > V_1$, $T_3 > T_2 > T_1$, $\Delta V_3 > \Delta V_2 > \Delta V_1$, and $G_3 > G_2 > G_1$. Each of the condition factors $T_0$, $\Delta V$ and $G_0$ has three different values one of which is selected according to that the vehicle speed is low, middle or high. The vehicle speed is detected and the range of speed is determined as low speed range (less than $V_1$), middle speed range (between $V_1$ and $V_2$) or high speed range (over $V_2$). In the low speed range, the condition factors $T_0$, $\Delta V$, $G_0$ are determined as small values of $T_1$, $\Delta V_1$, $G_1$. In the middle speed range, the condition factors $T_0$, $\Delta V$, $G_0$ are determined as middle values of $T_2$, $\Delta V_2$, $G_2$. In the high speed range, the condition factors $T_0$, $\Delta V$, $G_0$ are determined as large value of $T_3$, $\Delta V_3$, $G_3$.

By changing the value of each of the condition factors in accordance with the vehicle speed, it is possible to avoid malfunction of the anti-skid brake system due to the error of pulse counter for detecting the wheel speed, especially in high speed.

We claim:

1. An anti-skid brake control system for a motor vehicle, comprising:
   a wheel speed sensor which is disposed for each wheel of a vehicle and generates a pulse having a pulse cycle which corresponds to a revolutional speed of each wheel;
   a pulse cycle measuring circuit for detecting the cycle of the pulses of the pulse signal from the wheel speed sensor; and,
   condition setting means for setting anti-skid brake control condition factors in accordance with various wheel speeds by changing one of the factors of $T_0$, a predetermined time, and $G_0$, a predetermined value, responsive to wheel speed in accordance with the wheel speed classified as ranges of low speed, middle speed and high speed, where anti-skid brake control is started if a deceleration state, in which deceleration is greater than $G_0$, is continued for more than the predetermined $T_0$ and one of $T_0$ and $G_0$ is increased when wheel speed becomes high.

2. An anti-skid brake control system according to claim 1, wherein said pulse cycle measuring circuit is operatively connected to receive a clock signal having clock pulses and comprises a pulse counter for counting a number of the clock pulses occurring during one cycle of said pulse signal from said wheel speed sensor.

3. An anti-skid brake control system according to claim 1, wherein said anti-skid brake control factors further comprise $\Delta V$, a velocity change, which increases when the wheel speed becomes high, provided that a brake fluid pressure is reduced from a point at which a reference wheel speed $V_T$ intersects a detected wheel speed curve $V_w$, and the reference wheel speed $V_T$ being defined as a straight line having a predetermined inclination angle $\theta_1$ and extending from a point which is less by said velocity change $\Delta V$ than a point Q on the detected wheel speed curve $V_w$ at which the deceleration thereof corresponds to said inclination angle $\theta_1$.

4. An anti-skid brake control system for a motor vehicle, comprising:
   a wheel speed sensor which is disposed for each wheel of a vehicle and generates a pulse signal having a pulse cycle which corresponds to a revolutional speed of each wheel;
   a pulse cycle measuring circuit for detecting the cycle of the pulses of the pulse signal from the wheel speed sensor; and
   condition setting means for setting anti-skid brake control condition factors in accordance with various wheel speeds and controlling said anti-skid brake control system in accordance with condition factors corresponding to one of the wheel speeds, said condition setting means determining the condition factors by changing one of the factors of $T_0$, a predetermined time, and $G_0$, a predetermined value, responsive to wheel speed in accordance with the wheel speed classified as ranges of low speed, middle speed and high speed, where anti-skid brake control is started if a deceleration state, in which deceleration is greater than $G_0$, is continued for more than the predetermined $T_0$ and one of $T_0$ and $G_0$ is increased when wheel speed becomes high.

5. An anti-skid brake control system for a motor vehicle, comprising:
   a wheel speed sensor which is disposed for each wheel of a vehicle and generates a pulse signal having a pulse cycle which corresponds to a revolutional speed of each wheel;
   a pulse cycle measuring circuit for detecting the cycle of the pulses of the pulse signal from the wheel speed sensor; and
   condition setting means for setting anti-skid brake control condition factors in accordance with various wheel speeds so that said anti-skid brake control system is controlled in accordance with condition factors corresponding to one of the wheel speeds, said condition setting means determining the condition factors in accordance with the vehicle speed classified as ranges of low speed, middle speed and high speed, said condition factors comprising:

a speed difference value $\Delta V$ representing a value of wheel speed used for determination of a reference speed value $V_T$ which is less than the wheel speed;

a first reference time value $T_N$ used for discrimination of the wheel speed between a deceleration due to braking and a deceleration due to noise;

a second reference time value $T'_N$ used for discrimination of the wheel speed between a low peak due to braking and a low peak due to noise; and a deceleration threshold level $G_1$ representing a level of deceleration used for determination of a starting point at which the reference speed $V_T$ decreases at a constant gradient with respect to the wheel speed.

6. An anti-skid brake control system for a motor vehicle, comprising:

a wheel speed sensor which is disposed for each wheel of a vehicle and generates a pulse signal having a pulse cycle which corresponds to a revolutional speed of each wheel;

a pulse cycle measuring circuit for detecting the cycle of the pulses of the pulse signal from the wheel speed sensor; and condition setting means for setting anti-skid brake control condition factors in accordance with various wheel speeds so that said anti-skid brake control system is controlled in accordance with condition factors corresponding to one of the wheel speeds, said condition setting means determining the condition factors in accordance with the vehicle speed classified as ranges of low speed, middle speed and high speed, said condition factors comprising:

a speed difference value $\Delta V$ representing a value of wheel speed used for determination of a reference speed value $V_T$ which is less than the wheel speed;

reference time values $T_N$ and $T'_N$ used in determining an occurrence of an actual acceleration/deceleration state so as to avoid anti-skid brake control based on noise signals;

a deceleration threshold level $G_1$ representing a level of deceleration used for determination of a starting point at which the reference speed $V_T$ decreases at a constant gradient with respect to the wheel speed.

* * * * *

UNITED STATES PATENT AND TRADEMARK OFFICE
CERTIFICATE OF CORRECTION

PATENT NO. : 4,930,083

DATED : May 29, 1990

INVENTOR(S) : Akira Hoashi et al.

Figure 2:
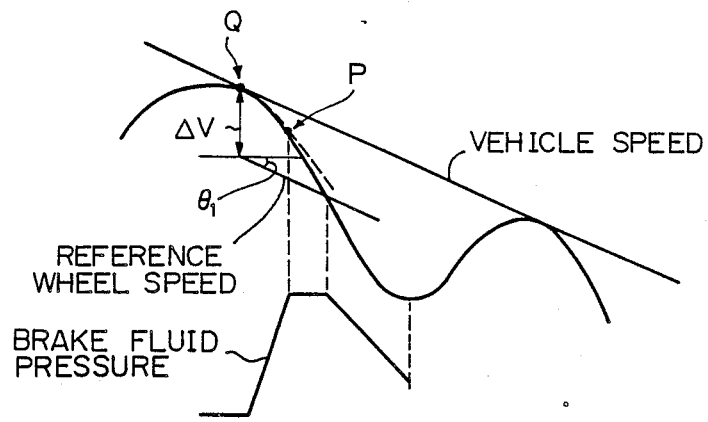
FIG. 2 is an explanatory view of the function of the condition setting means of the present invention.

It is certified that error appears in the above-identified patent and that said Letters Patent is hereby corrected as shown below:

Please substitute the attached Fig. 2 for Fig. 2 of the patent.

Signed and Sealed this

Thirtieth Day of July, 1991

Attest:

HARRY F. MANBECK, JR.

*Attesting Officer*    Commissioner of Patents and Trademarks